Aug. 4, 1931.  J. C. BRILES  1,817,874
STEEL GUARD CAGE
Filed May 31, 1930    2 Sheets-Sheet 1

J. C. Briles
INVENTOR
BY Victor J. Evans
ATTORNEY

Aug. 4, 1931.  J. C. BRILES  1,817,874
STEEL GUARD CAGE
Filed May 31, 1930  2 Sheets-Sheet 2

J. C. Briles
INVENTOR
BY Victor J. Evans
ATTORNEY

Patented Aug. 4, 1931

1,817,874

UNITED STATES PATENT OFFICE

JOHN C. BRILES, OF OTTAWA, KANSAS

STEEL GUARD CAGE

Application filed May 31, 1930. Serial No. 458,600.

My present invention has reference to an improved guard cage for safe guarding the employees and property of banks, post offices, garage stations, stores, etc., from attack and robbery.

The primary object of the invention is the provision of a guard cage that comprises a bullet-proof turret and which is preferably cylindrical in cross section divided into an upper and lower parts or compartments, the lower compartment being provided with a segmental door that is mounted for movement on ball bearings and which has disposed opposite the door wing shields provided with apertures whereby the guard can observe outside conditions before entering the cage or whereby the guard can employ the apertures as sight openings for guns should the premises be attacked by robbers, the door being suitably latched when closed should the guard find it necessary to enter the cage, the said cage being provided with a ladder and with a revoluble seat to be occupied by the guard when his firearm is directed through the shutter-closed openings and the ledge between the upper and lower sections or through similar openings directly above such ledge, the first mentioned openings being also utilized as a rack for the firearms, and the last mentioned openings, if desired, being employed as sight openings.

With the foregoing and other objects in view the invention consists in the combination to be hereinafter fully described, pointed out in the appended claims and illustrated in the accompanying drawings which form a part of this specification and in which:—

Figure 1:
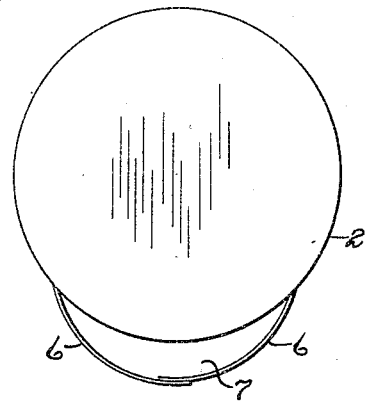
Figure 1 is a top plan view of the improvement.
Figure 4:
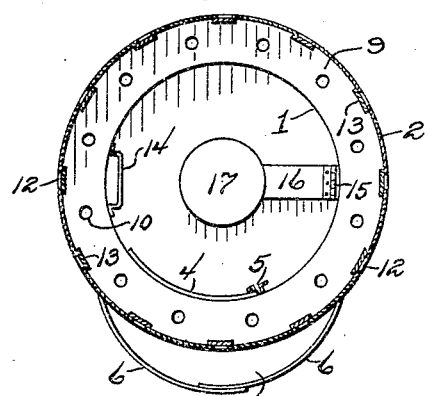
Figure 4 is a sectional view approximately on the line 5—5 of Figure 2.
Figure 2:
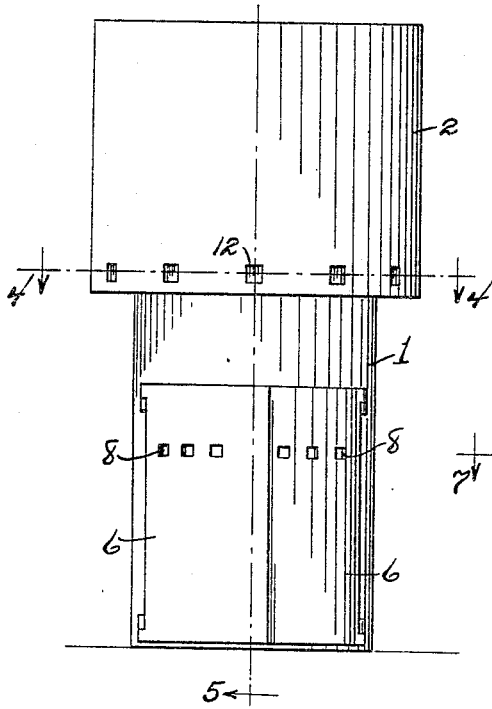
Figure 2 is an elevation thereof.
Figure 3:
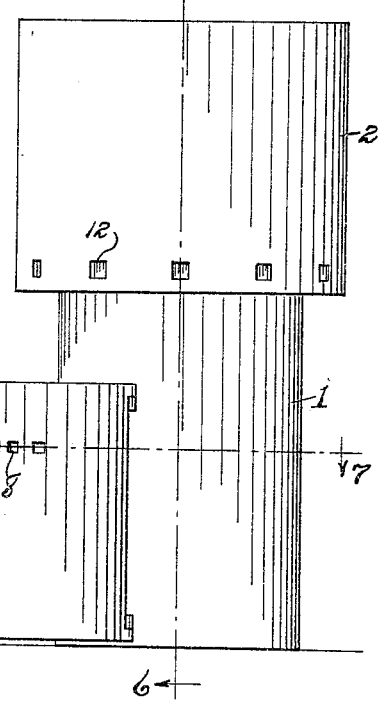
Figure 3 is a view looking rightangularly with respect to the showing in Figure 2.
Figure 5:
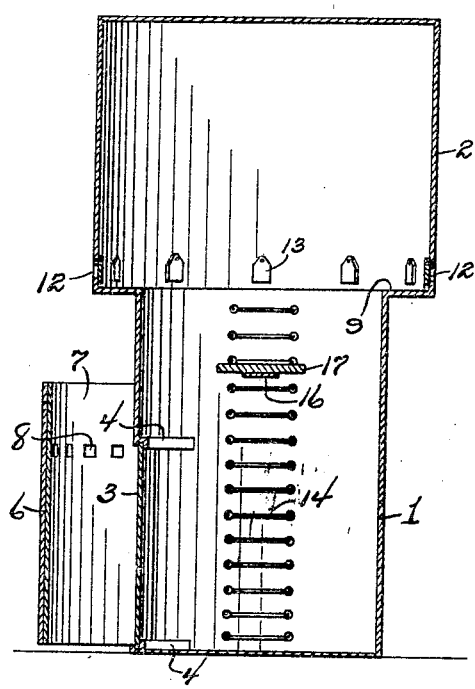
Figure 5 is a sectional view approximately on the line 5—5 of Figure 2.

My improved guard cage is designed to be erected at a suitable point in an office, bank, store, filling station or the like, whereby the guard can have ready access thereto and also whereby the guard can observe conditions at every point of the establishment in which the device is arranged. The improvement is of bullet-proof metal and primarily includes a lower preferably cylindrical section 1 and an upper cylindrical section 2 of a greater cross sectional diameter than the section 1. The top and bottom of both the sections 1 and 2 are closed and obviously the section 1 is firmly affixed to the floor of the establishment in which the cage is erected.

The lower section 1 is provided with an opening designed to be closed by a segmental door 3. The door has its top and bottom edges guided in flanged segmental tracks 4 and there are anti-frictional bearings between the door and the tracks. The door 3 when swung to closed position is latched by means 5, such latching means being preferably of the automatic type. On the lower section 1, to the opposite sides of the opening closed by the door 3 there are hingedly secured segmental guard shields 6. These shields when swung to closed positions have their edges disposed in lapping relation and provide a space 7 between the shields and the section 1 of a sufficient size to permit of the free movement of a guard therein. The sections 6, adjacent to the top thereof, are provided with openings 8 and these openings may be employed as observation openings by the guard or as openings for the passage of the barrels of firearms. If desired, means may be provided for holding the shields 6 in closed position.

Figure 6:
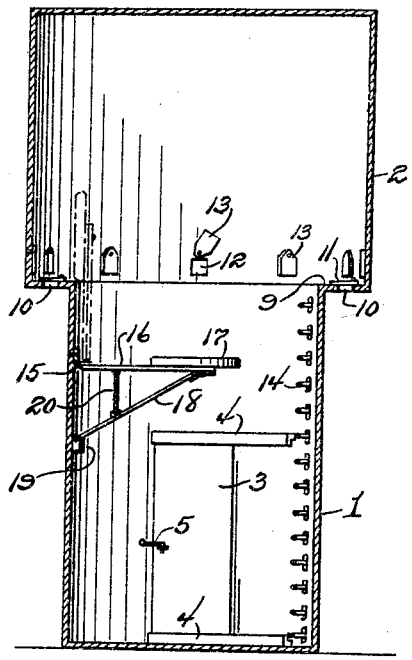
Figure 6 is a sectional view approximately on the line 6—6 of Figure 3.
Figure 7:
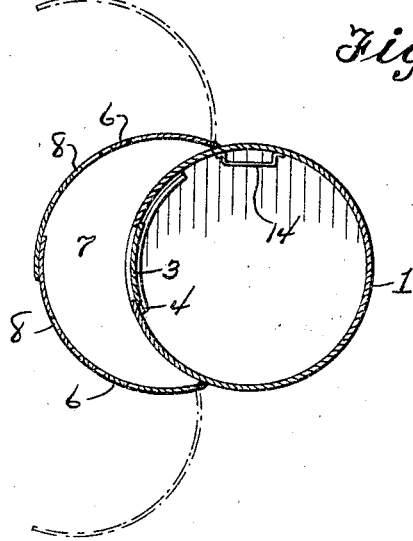
Figure 7 is a sectional view approximately on the line 7—7 of Figure 3.

The ledge 9 provided between the lower section 1 and the upper section 2 has spaced openings 10 therethrough and these openings are primarily designed to afford a rack for gun barrels but as disclosed by Figure 6 of the drawings the openings may be closed by swingable shutters 11. The section 2 above the ledge or flange 9, adjacent to said ledge or flange is provided with a plurality of equidistantly spaced openings 12 and the openings 12 are normally covered by pivotally supported shutters 13.

On one side of the lower section 1 in close proximity to the door 3 there is a ladder. The ladder is preferably constructed of metal rods 14 having angle ends which are secured to the section 1. The ladder permits of the guard, after passing through the opening in the section 1 and closing the door 3 to ascend to the section 2 and readily grasp the gun from the rack afforded by the openings 10. In this connection I desire to state that other racks for the firearms may be employed. Opposite the ladder or stairway 14 there is hingedly secured, as at 15, to the lower section 1 a plate or bar 16 on which there is pivotally mounted a seat 17. On the lower face and at the outer end of the bar or rod 16 there is hingedly secured a brace member 18 designed to have its free end engage with the stop element 19 in the section 1 for holding the seat in horizontal position as disclosed by Figure 6 of the drawings. A flexible element 20 connects the supporting member 16 for the seat 17 with the brace 18. The brace 18 may be readily raised from engagement with the stop element 19 so that the seat can be swung upwardly to the dotted line position disclosed by Figure 6 of the drawings, and suitable means are provided for holding the seat in such position, and likewise if desired, the seat can be swung downwardly.

A guard may occupy the space 7 provided between the shields 6 and the section 1 and through the openings 8 observe exterior conditions. However, this space 7 may be occupied by the guard should a holdup or robbery be attempted and he can readily grasp the firearms and point the same through the openings 8 and thereby frustrate the attempt of robbery. Should the attempt become serious the guard can pass from the space 7 through the opening covered by the door 3, close and latch the said door, swing the seat to operative position, ascend the ladder and employ the openings 12 either as sight openings or as openings for the barrels of the firearms for destroying the robbers. When the openings 12 are employed as sight openings the barrels of the guns are directed angularly through the openings 10.

It is thought the construction and advantages of the improvement will be apparent to those skilled in the art to which such invention relates so that further detailed description will not be required, but obviously I do not wish to be restricted to the precise details herein set forth and, therefore, hold myself entitled to make such changes therefrom as fairly fall within the scope of what I claim.

Having described the invention, I claim:

1. A guard cage comprising a cylindrical member provided with a rack for firearms and with openings, pivoted shutters for closing the openings, said member, adjacent its bottom being provided with a segmental opening, a segmental door for closing the opening, latching means for the door and segmental wing shields pivotally secured in the cage at the opposite sides of the door opening and provided each with a series of apertures.

2. A guard cage comprising a cylindrical member provided with a rack for firearms and with openings, pivoted shutters for closing the openings, said member, adjacent its bottom being provided with a segmental opening, a segmental door for closing the opening, latching means for the door and segmental wing shields pivotally secured in the cage at the opposite sides of the door opening and provided each with a series of apertures and a ladder in the lower portion of the cage below the shutter closed openings.

3. A guard cage comprising a cylindrical member provided with a rack for firearms and with openings, pivoted shutters for closing the openings, said member, adjacent its bottom being provided with a segmental opening, a segmental door for closing the opening, latching means for the door, segmental wing shields pivotally secured in the cage at the opposite sides of the door opening and provided each with a series of apertures, a ladder in the lower portion of the cage below the shutter closed openings and a swingably supported pivotally mounted revoluble seat in the cage opposite the ladder.

4. A guard cage for the purpose set forth, comprising upper and lower cylindrical members, the upper member being of a greater cross sectional diameter than the lower member and affording a ledge therebetween, both of said members having their ends closed, the lower member having a door opening therein, segmental tracks above and below the opening, a segmental door slidable in the tracks, anti-friction means between the door and the tracks, hingedly supported segmental wings on the lower section at the opposite sides of the door designed to have their ends lapping when in closed position to afford a space between the lower section and the said wings, the said wings having sight openings therethrough, a ladder made up of rods having angle ends fixed on the lower section and leading to the upper section, a hingedly supported plate in the lower section, a brace rod pivotally secured to the outer end of the plate, a stop element to engage with the brace rod, a flexible connection between the plate and the brace, a pivoted seat on the plate, the ledge between the upper and lower sections having spaced apertures therethrough and the upper section being provided with openings directly above the ledge and pivotally secured shutter plates for closing the openings.

In testimony whereof I affix my signature.

JOHN C. BRILES.